United States Patent
Kurupati

(10) Patent No.: US 7,834,873 B2
(45) Date of Patent: Nov. 16, 2010

(54) DISPLAY PROCESSING LINE BUFFERS INCORPORATING PIPELINE OVERLAP

(75) Inventor: Sreenath Kurupati, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/510,045

(22) Filed: Aug. 25, 2006

(65) Prior Publication Data

US 2008/0049037 A1 Feb. 28, 2008

(51) Int. Cl.
*G06T 15/00* (2006.01)
(52) U.S. Cl. ............... 345/423; 345/502; 345/506; 345/604; 382/260; 382/275; 348/307; 348/581; 348/607
(58) Field of Classification Search ........... 345/423, 345/502, 506, 604; 382/260, 275; 348/581, 348/607, 307
See application file for complete search history.

(56) References Cited

U.S. PATENT DOCUMENTS

| | | | |
|---|---|---|---|
| 5,469,223 A | 11/1995 | Kimura | |
| 6,642,962 B1 | 11/2003 | Lin et al. | |
| 6,765,622 B2 * | 7/2004 | Rathnam et al. | 348/581 |
| 6,970,207 B1 * | 11/2005 | Seigneret et al. | 348/607 |
| 7,266,255 B1 * | 9/2007 | Wasserman et al. | 382/307 |
| 7,317,459 B2 * | 1/2008 | Fouladi et al. | 345/604 |
| 7,433,538 B2 * | 10/2008 | Kusakabe et al. | 382/275 |
| 2006/0092320 A1 | 5/2006 | Nickerson et al. | |

FOREIGN PATENT DOCUMENTS

WO  WO 2006/050290  5/2006

OTHER PUBLICATIONS

K. Illgner, *DSPs for Image and Video Processing*, Signal Processing, vol. 80, Issue 11, pp. 2323-2336, Nov. 1, 2000.

* cited by examiner

*Primary Examiner*—Phu Nguyen
(74) *Attorney, Agent, or Firm*—Trop, Pruner & Hu, P.C.

(57) ABSTRACT

Apparatus, systems and methods for display processing line buffers incorporating pipeline overlap are disclosed. For example, an apparatus is disclosed including processing logic to use pixel processing algorithms to process a pixel value of a first portion of an image, and line buffers coupled to the processing logic. The line buffers to hold at least some pixel values of other portions of the image adjacent to the first portion. Where the pixel values of the other portions of the image held by the line buffers correspond to pixel values of the adjacent portions of the image that are to be convolved by the pixel processing algorithms with the pixel value of the first portion. Other implementations are also disclosed.

10 Claims, 6 Drawing Sheets

DISPLAY PROCESSING LINE BUFFERS INCORPORATING PIPELINE OVERLAP

BACKGROUND

Image processing for display is typically done in a raster fashion where pixels are processed serially starting from the left most pixel in the upper most row in a frame and proceeding down through the frame row by row such that all pixels in any particular row are processed together. While processing a given pixel in one row of the frame a pixel processing algorithm or "filter kernel" may need to access surrounding vertical pixels. However, because pixels are usually serially scanned in a raster fashion through a typical processing pipeline the surrounding vertical pixels may not be immediately available.

A common solution to accessing surrounding vertical pixels is to use line buffers to store pixels of the rows surrounding the pixel being processed so that those vertical pixels are readily available to the filter being implemented. Thus, for example, to use a five-by-five (5×5) two-dimensional (2D) filter kernel the common solution is to employ four line buffers to store the pixels of the four surrounding rows. For a 9×9 2D filter eight line buffers need to be employed. However, line buffers are costly to implement. This is particularly true in full high-definition (HD) image processing where each line buffer is typically wide enough to store at least 1,920 pixel values. For a typical image processing pipeline employing multiple filter kernels the expense associated with using full width line buffers can become prohibitive.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
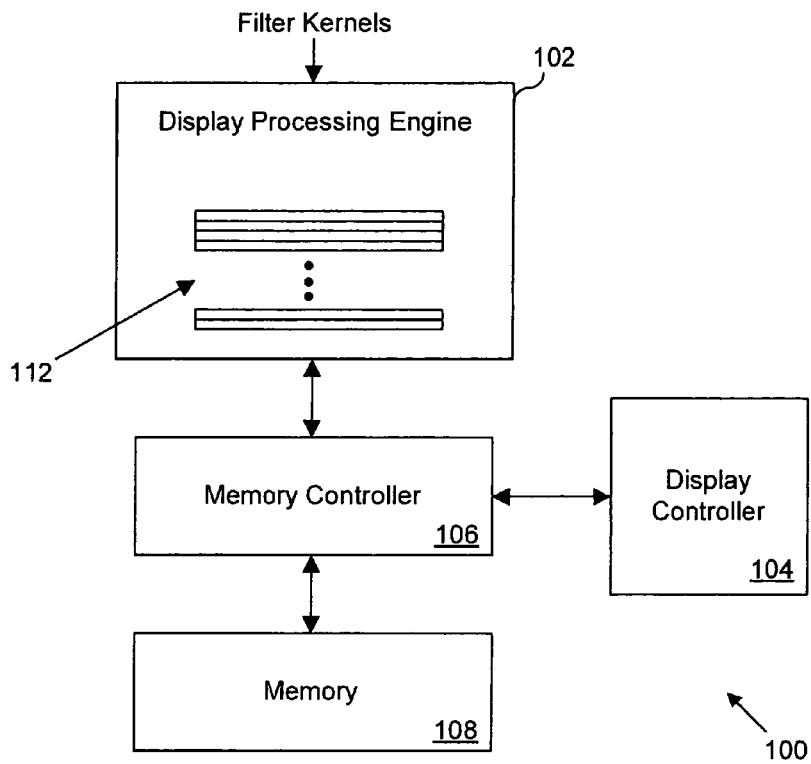
FIG. 1 illustrates portions of an image processing system in accordance with some implementations of the invention.

FIG. 1 is a simplified block diagram of portions of an image processing system 100 in accordance with some implementations of the claimed invention. System 100 may include a display processing engine (DPE) 102, a display controller 104, a memory controller 106, and memory 108. DPE 102 also includes a set of line buffers 112.

DPE 102 may be any combination of logic in hardware, software and/or firmware form capable of supporting processing of pixel data where, in accordance with some implementations of the invention, DPE 102 may include processing logic at least capable of assessing an overall pipeline horizontal overlap associated with a set of filter kernels where that set of filter kernels may be considered to comprise a filter pipeline to be implemented by DPE 102 as will be explained in further detail below. Toward that end, DPE 102 may, in accordance with some implementations of the invention, be capable of providing line buffers 112 of sufficient width to support processing of pixel data wherein varying degrees of overlap between horizontally adjacent regions may be provided as will be explained in further detail below. In addition, DPE 102 may include one or more processing cores (now shown), each of which may be capable of undertaking, in a parallel and/or simultaneous fashion, processes in accordance with implementations of the invention. The uses and functionality of DPE 102 will be explained in greater detail below.

Display controller 104 may comprise any processing and/or control logic (i.e., in the form of hardware, software, and/or firmware) capable of converting processed pixel data supplied by DPE 102 into a format suitable for driving a display (i.e., display-specific data). For example, while the invention is not limited in this regard, DPE 102 may provide processed pixel data to controller 104 in a specific color data format, for example in a compressed red-green-blue (RGB) format, and controller 104 may modify such data by generating, for example, corresponding liquid crystal display (LCD) drive data levels etc. Although FIG. 1 shows DPE 102 and controller 104 as distinct components, the invention is not limited in this regard, and those of skill in the art will recognize that, for example, some if not all of the functions of display controller 104 may be performed by DPE 102 or, further, that the functionality of DPE 102 and/or controller 104 may be provided by a display processor and/or a host processor such as a microprocessor.

Memory controller 106 may comprise any memory access logic (i.e., in the form of hardware, software, and/or firmware) capable of providing DPE 102 with pixel data (i.e., pixel values) to be processed or filtered by DPE 102 in response to a set of the filter kernels. Controller 106 may also provide DPE 102 with access to memory 108 for the purpose of storing pixel data corresponding to pixel values processed by DPE 102. Memory controller 106 may also provide display controller 104 with access to pixel data (processed or otherwise) stored or held in memory 108. The invention is, however, not limited to particular implementations of memory controller 106 and thus this item will not be described in greater detail herein.

Memory 108 may comprise any memory device or mechanism suitable for storing and/or holding pixel data (e.g., in the form of luminance and color difference signals (i.e., "YUV" data) or red-green-blue (RGB) color pixel data or values, or other possible formats). While memory 108 may comprise any volatile or non-volatile memory technology such as Random Access Memory (RAM) memory or volatile memory technology (e.g., Flash memory), the invention is in no way limited by the type of memory employed for use as memory 108.

Figure 2:
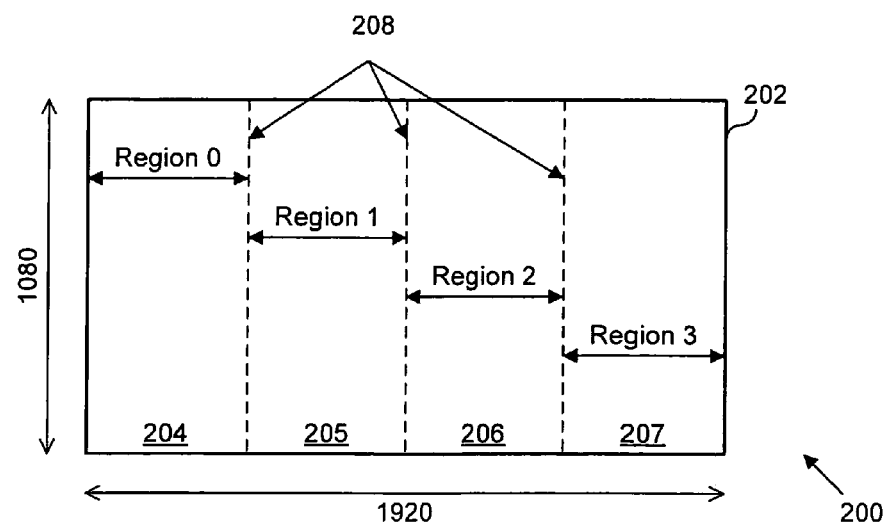
FIG. 2 illustrates an example image processing scheme.

FIG. 2 illustrates a simplified example of a scheme 200 for image processing. FIG. 2 is offered solely to aid discussion of processes in accordance with some implementations of the invention, and thus no quantities or items shown in FIG. 2 should be construed to limit the invention in any way. FIG. 2 shows an image frame 202 corresponding, for example, to a high-definition (HD) 1920×1080 display format (i.e., where frame 202 includes 1,920 vertical columns and 1,080 horizontal rows of pixel values) where frame 202 has been divided into four horizontally adjacent regions 204-207 each of which includes 1,080 rows and 480 columns of pixel values and each of which is defined with respect to adjacent regions by boundaries 208. While four regions 204-207 are shown in FIG. 2, the invention itself is not limited by the number of regions employed or the width (e.g., measured in columns of pixels per region) of those regions employed.

In accordance with some implementations of the invention for an image processing scheme applied to a given row of pixels of frame 202 the pixels of any given region 204-207 may be processed separately from the pixels of any other regions 204-207. In other words, for example, pixels in region 205 may be processed separately from pixels in region 206. Further, in accordance with some implementations of the invention, pixels of any of regions 204-206 may be processed separately in a sequential and/or serial manner (i.e., by one processing core) or in a parallel fashion (i.e., by a plurality of processing cores). Moreover, an image processing scheme in accordance with some implementations of the invention may be distinguished from a raster scan image processing scheme in that, for a given row of frame 202, a raster scan image processing scheme may process all pixels of that row in a sequential and/or serial manner.

Figure 3:
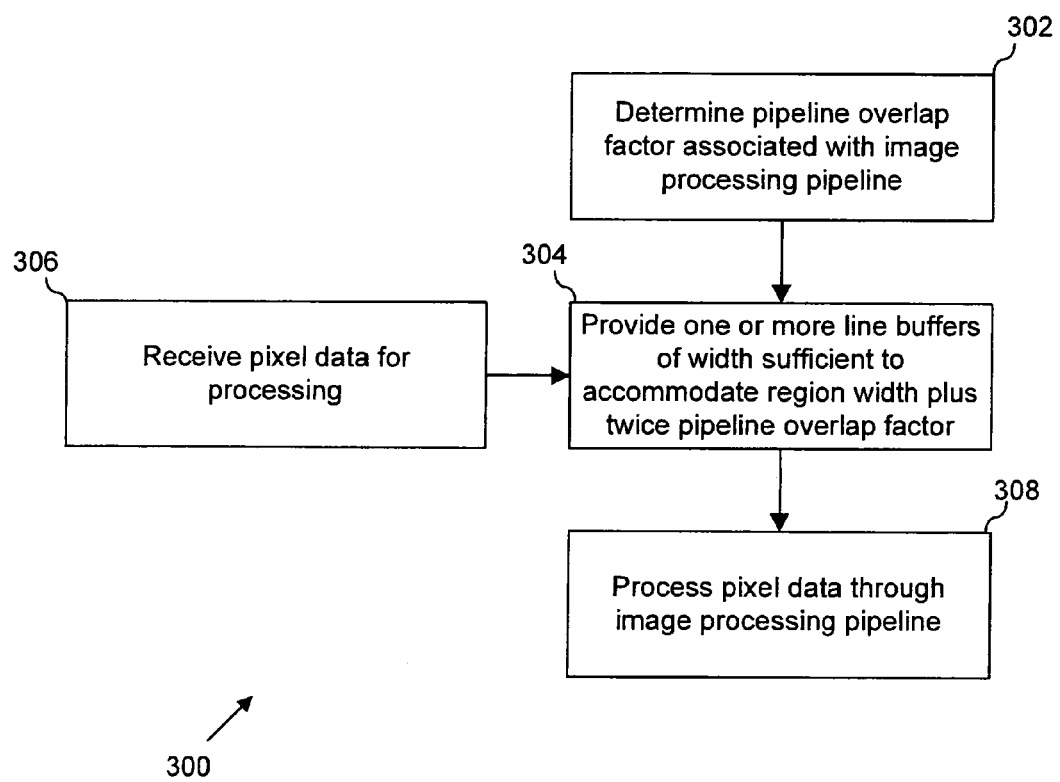
FIG. 3 is a flow chart illustrating a process in accordance with some implementations of the invention.

FIG. 3 is a flow chart illustrating a process 300 in accordance with some implementations of the invention. While, for ease of explanation, process 300 may be described with regard to system 100 of FIG. 1 and scheme 200 of FIG. 2, the claimed invention is not limited in this regard and other processes or schemes supported by appropriate devices in accordance with the claimed invention are possible.

Process 300 may begin with the determination of a pipeline overlap value associated with an image processing pipeline [act 302]. In accordance with some implementations of the invention DPE 102 may undertake act 302 in a preprocessing stage. That is, act 302 may be undertaken when DPE 102 is configured to implement an image processing pipeline where that pipeline employs one or more filter kernels to process pixel data. Those skilled in the art will recognize that image processing undertaken by devices such as DPE 102 may employ one or more filter kernels where those kernels comprise, in effect, numerical matrices that act, for example, to convolve a given pixel value with the weighted values of surrounding pixels. Further, as those skilled in the art will also recognize, devices such as DPE 102 may, in response to a filter algorithm, employ internal processing logic to process pixel values to implement the corresponding numerical kernel.

Figure 4:
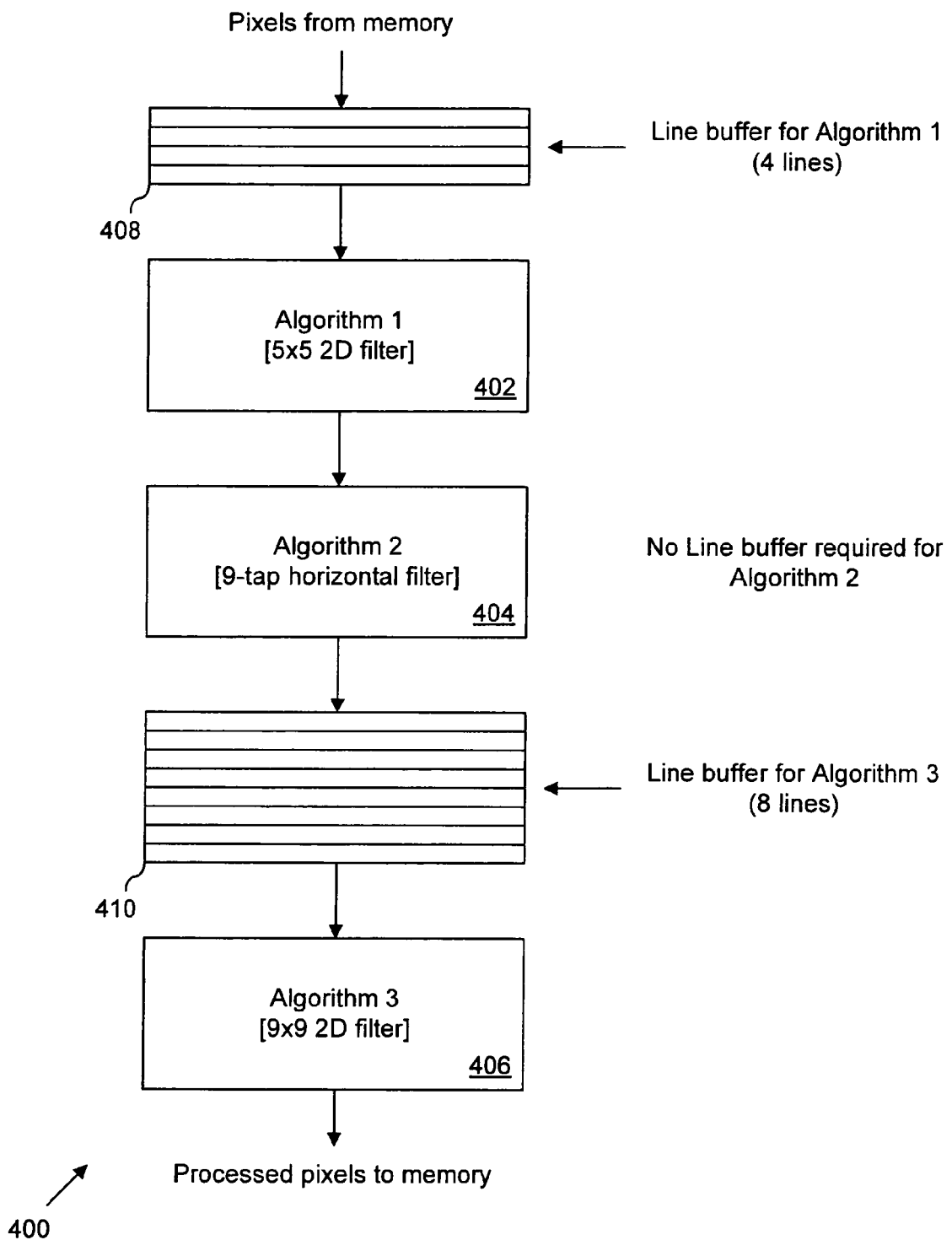
FIG. 4 illustrates an example image processing pipeline scheme.

FIG. 4 illustrates an example image processing pipeline 400 employing a series of filter kernels. FIG. 4 is offered to aid discussion of process 300, in particular act 302, and no quantities or items shown therein should be construed to limit the invention in any way. Pipeline 400 includes a series of three algorithms or filter kernels: a first algorithm 402 (corresponding to a 5×5 two-dimensional (2D) filter kernel), a second algorithm 404 (corresponding to a 9-tap horizontal, or one-dimensional (1D), filter), and a third algorithm 406 (corresponding to a 9×9 2D filter). Those skilled in the art will recognize what the terms N×N 2D filter kernel (e.g., 5×5 2D, 9×9 2D, etc.) and N-tap horizontal filter imply although these terms will be placed in further context below. Algorithms 402-406 are example algorithms provided in FIG. 4 solely for explanatory purposes and should not be construed to limit the invention to particular image processing algorithms and/or particular image processing pipeline schemes.

Those skilled in the art will further recognize that an image processing scheme employing algorithm 402 may require the use of a line buffer 408 having at least four (4) lines to store the pixels values for four (4) rows of pixel values of the rows of pixel values vertically adjacent and/or neighboring (two rows above and two rows below) to the pixel being processed by algorithm 402. Similarly, employing algorithm 406 may require the use of a line buffer 410 having at least eight (8) lines to store the pixels values for eight (8) rows of pixel values. Further, those skilled in the art will recognize that algorithm 404, the 9-tap horizontal algorithm, does not require the use of line buffers storing adjacent rows of pixel values because this algorithm convolves the pixel being processed with values from neighboring and/or adjacent pixels in the same row. Moreover, in accordance with some implementations of the invention, if pipeline 400 is employed to undertake image processing of a frame of pixel data where that frame is divided into horizontally adjacent image regions then the width (i.e., the number of pixel values stored in each line or row) of the line buffers 408/410 may correspond to a width that is less than the full horizontal resolution of the image frame to be processed by pipeline 400.

Figure 5:
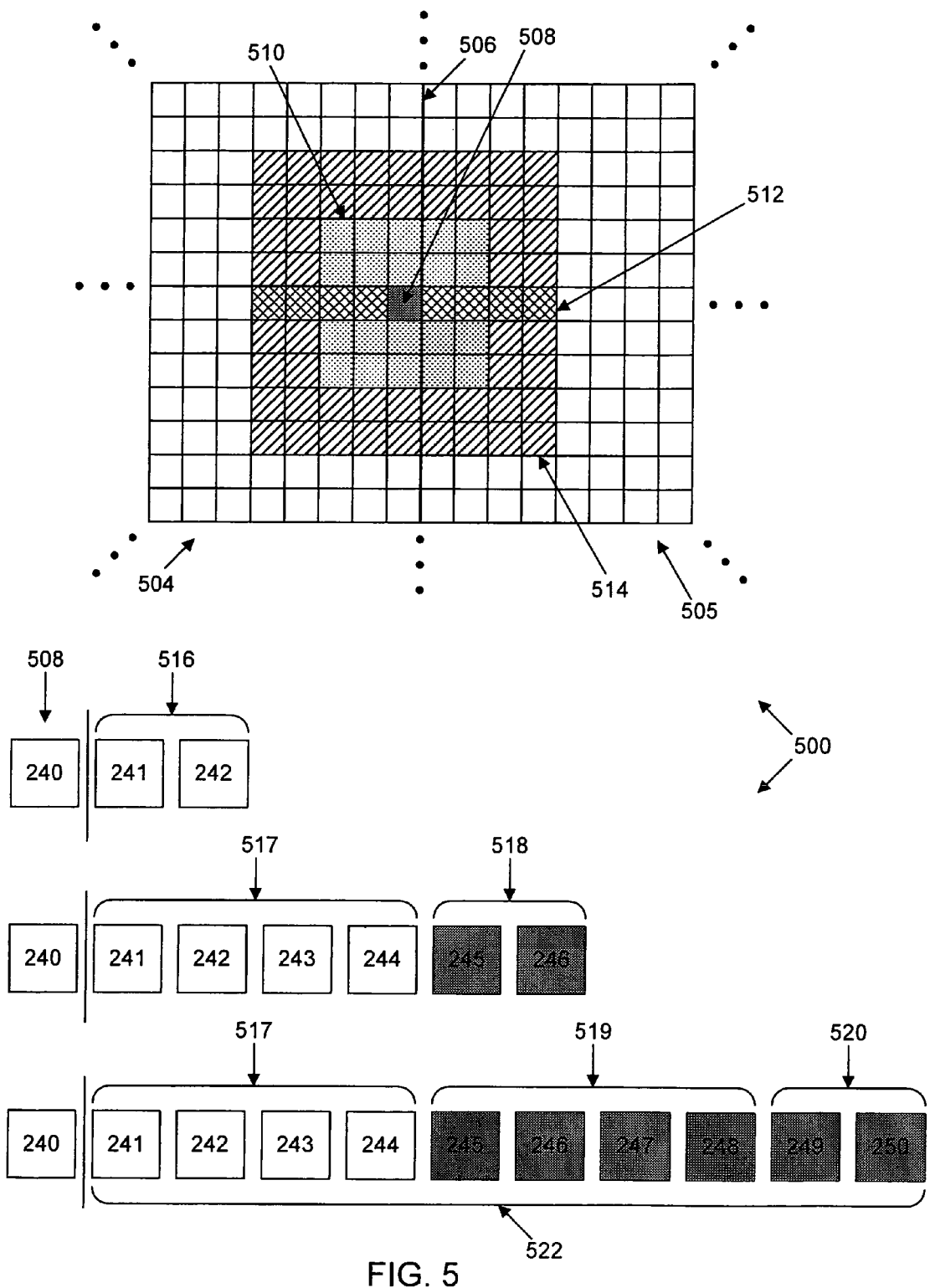
FIG. 5 illustrates an example image processing pixel labeling scheme.

FIG. 5 illustrates an example scheme 500 for labeling pixels. FIG. 5 is offered to aid discussion of process 300, in particular act 302, and no quantities or items shown therein should be construed to limit the invention in any way. FIG. 5 includes representative portions of two adjacent image regions 504 and 505 separated by a region boundary 506. Consider the case where a pixel 508, within region 504 and lying adjacent to the region boundary (e.g., where pixel 508 is the 240$^{th}$ pixel in one row of a 240 pixel-wide region) is to be processed by DPE 102 employing pipeline 400 (FIG. 4). For pixel 508, application of algorithm 402 convolves the value of pixel 508 with the weighted values of the 5×5 matrix 510 of pixels surrounding pixel 508, application of algorithm 404 convolves the value of pixel 508 with the weighted values of the four neighboring pixels 512 located within the same row on either side of pixel 508, and application of algorithm 406 convolves the value of pixel 508 with the weighted values of the 9×9 matrix 514 of pixels surrounding pixel 508 as shown.

In considering FIG. 5 in the context of pipeline 400 (FIG. 4), it may be recognized that application of pipeline 400 to pixel 508 of region 504 should result in the convolution of some pixels in region 505 with pixel 508's value if the value of pixel 508 is to be accurately processed by pipeline 400. In particular, considering only the row containing pixel 508 where, for the sake of argument, pixel 508 is the 240$^{th}$ and last pixel in region 504 (example region width of 240 pixels) then algorithm 402 (5×5 2D filter) should convolve the values of the adjacent two pixels 516 (e.g., the 241$^{st}$ and 242$^{nd}$ pixels) to the right of pixel 508. Similarly, algorithm 404 (9-tap horizontal filter) should convolve the values of the adjacent four pixels 517 (e.g., the 241$^{st}$ through the 244$^{th}$ pixels) to the right of pixel 508. However, when doing so, unless algorithm 402 has convolved the two further adjacent pixels 518 (e.g., the 245th and 246th pixels) to the right of those four pixels 517, then algorithm 404 may not, for example, use a correct value for the 244th pixel when it convolutes it with the 240th pixel's value (i.e., pixel 508's value).

Likewise, algorithm 406 (9×9 2D filter) should convolve the values of the adjacent four pixels 517 (e.g., the 241st through the 244th pixels) to the right of pixel 508. However, when doing so, unless algorithm 404 has convolved the four further adjacent pixels 519 (e.g., the 245th through the 248th pixels) to the right of those four pixels 517 and unless algorithm 402 has also convolved the two further adjacent pixels 520 (e.g., the 249th and 250th pixels) to the right of the four pixels 519, then algorithm 406 may not, for example, use a correct value for the 244th pixel when it convolutes it with the 240th pixel's value. Thus, in order to ensure that the result of applying pipeline 400 to pixels in a region of an image frame divided into horizontally adjacent regions is mathematically similar to the results that would be obtained in a raster scan pixel processing scheme a horizontal overlap may be defined in accordance with the invention where that horizontal overlap includes sufficient pixels taken from regions adjacent to the region being processed.

For example, as shown in FIG. 5, to obtain a mathematically correct application of pipeline 400 to a right-most pixel 508 in region 504 an overlap 522 may be defined in accordance with some implementations of the invention where that overlap includes the ten pixels in region 505 that are adjacent to that right-most pixel. Thus, in accordance with some implementations of the invention, if overlap 522 is incorporated into the processing of region 504 then image processing of region 504 may produce mathematically similar results to those produced by a standard raster scan process.

Generally speaking, a pipeline overlap factor may be defined in accordance with some implementations of the invention where that factor may be expressed as $$\text{pipeline\_overlap} = \sum_{i=0}^{n-1} \text{h\_overlap}[i] \quad (1)$$

where each algorithm "i" in a pixel processing pipeline has an associated horizontal overlap factor h_overlap[i]. Thus, for example, algorithm 402 in pipeline 400 would have a horizontal overlap factor of two (2), and both of algorithms 404 and 406 in pipeline 400 would have horizontal overlap factors of four (4). Hence, the value of pipeline_overlap (equation 1) for pipeline 400 would be ten (10). In accordance with some implementations of the invention, act 302 may involve having DPE 102 determine a pipeline overlap factor in accordance with equation 1 where DPE 102 has been provided with the individual horizontal overlap factors h_overlap[i] of the algorithms of the pixel processing pipeline to be used in process 300. Alternatively, the pipeline overlap factor may be provided to DPE 102 by another device such as, for example, a host processor.

Figure 6:
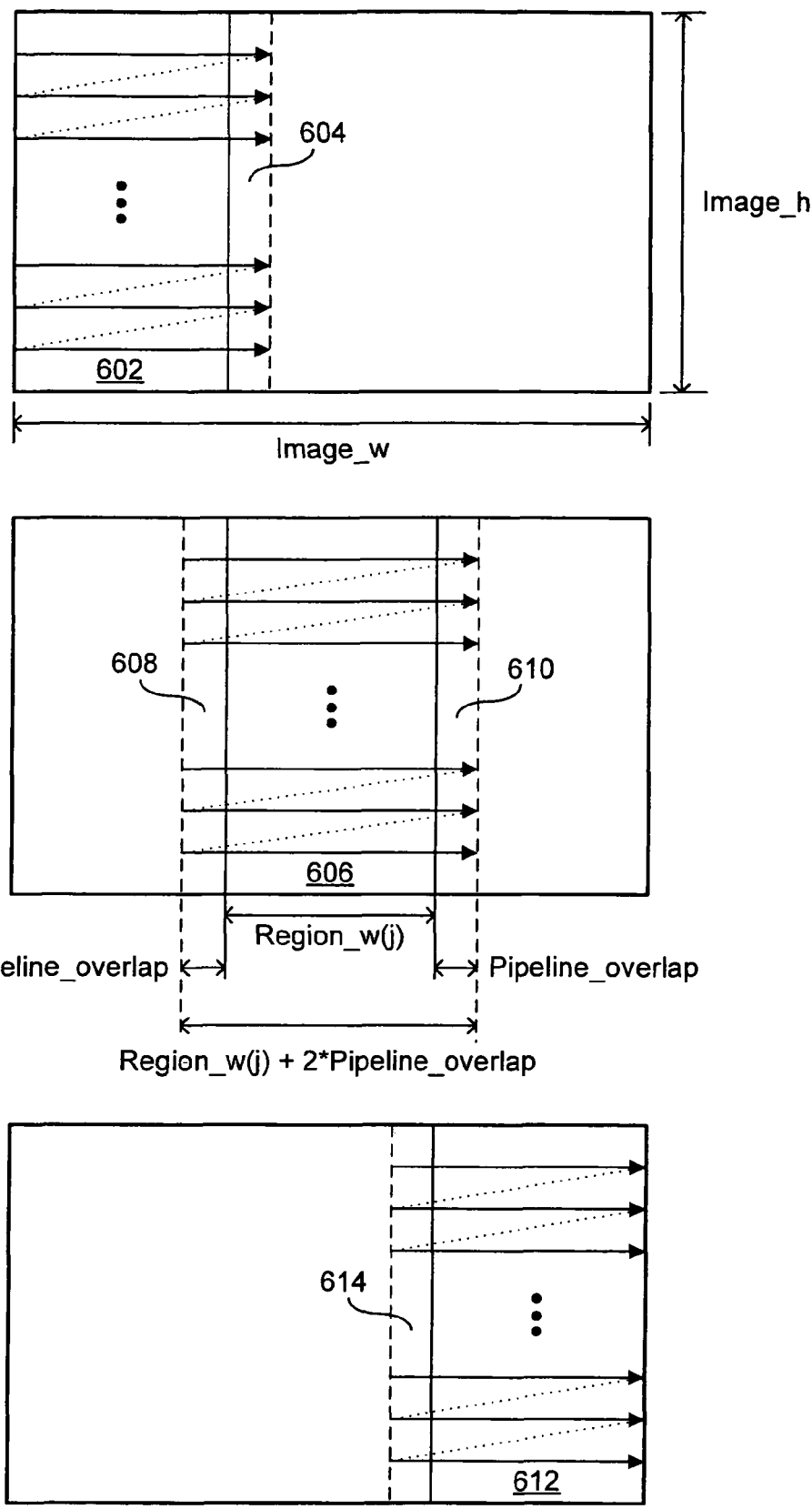
FIG. 6 illustrates an example image processing scheme incorporating pipeline overlaps in accordance with some implementations of the invention.

Process 300 may then continue with the provision of one or more line buffers having widths sufficient to accommodate a region width plus twice the pipeline overlap factor [act 304]. FIG. 6 illustrates an example image 600 showing, in accordance with some implementations of the invention, horizontal overlaps associated with image regions where those overlaps have widths corresponding to the pipeline overlap factor determined in act 302. FIG. 6 is offered to aid discussion of process 300, in particular act 304, and no quantities or items shown therein should be construed to limit the invention in any way.

As FIG. 6 shows, example image 600 has been divided into three horizontally adjacent regions including a left-most region 602 that may, in accordance with some implementations of the invention, have an overlap 604 incorporating a number of columns of an adjacent region 606 where the width of overlap 604 corresponds to the pipeline overlap factor as determined in act 302 for a particular image processing pipeline. Because most image processing algorithms such as filter kernels are symmetric, the next region 606 may, in accordance with some implementations of the invention, have two overlaps, a first overlap 608 incorporating a number of columns of region 604 to the left of region 606 and a second overlap 610 incorporating a number of columns of a region 612 to the right of region 606. The widths of both overlap 608 and 610 may also correspond to the pipeline overlap factor as determined in act 302.

Finally, the third and right-most region 612 may have an overlap 614 incorporating a number of columns of region 606 to the left of region 612. Again, the width of overlap 614 may also correspond to the pipeline overlap factor as determined in act 302. Thus, if, for example, pipeline 400 is applied separately to pixels in regions 602, 606, and 612 then, in accordance with some implementations of the invention, each of overlaps 604, 608, 610 and 614 may have a width equivalent to a pipeline overlap factor of ten (10). In other words, using this example, each of overlaps 604, 608, 610 and 614 may have a width sufficient to include ten columns of the respective adjacent regions 606, 602, 612, and 606.

If, as shown in FIG. 6, the image to be processed has respective horizontal and vertical dimensions image_w and image_h then each region "j" may have respective horizontal and vertical dimensions region_w(j) and image_h. In addition, as discussed above, each region may be associated with one or two overlaps of width equal to pipeline_overlap. Thus, in accordance with some implementations of the invention, the total width of the pixel data to be processed for each of regions 602 and 612 may be expressed as:

$$\text{region\_w}(j) + \text{pipeline\_overlap} \quad (2)$$

while the total width of the pixel data to be processed for region 606 may be expressed as:

$$\text{region\_w}(j) + 2 * \text{pipeline\_overlap} \quad (3)$$

Thus, assuming that all three regions have the same region width of, for example, 240 pixels and a pipeline_overlap value of 10 pixels, the width of pixel data to be processed for regions 602 and 612 would be 250 pixels while the width of pixel data to be processed for region 606 would be 260 pixels. Thus, in order for the application of an image processing pipeline to each region of image 600 to have mathematically similar results to what would be attained if the entire image 600 was processed in a raster scan manner, line buffers may be employed, in accordance with some implementations of the invention, that have a width consistent with equation (2). In other words, using the example above, those line buffers might have a width of 260 pixels as compared to the region width of 240 pixels.

It should be noted however, that the invention is not limited to a particular number of regions employed to process an image frame nor is the invention limited to all regions having the same region width. Moreover, the terms image region, image section, image strip, image stride, image swath, and/or image portion may be used interchangeably without departing from the scope and spirit of the invention.

Returning to FIG. 3, in undertaking act 304, DPE 102 may, having access to or having determined a pipeline overlap factor (e.g., pipeline_overlap) in act 302, use that overlap factor and the predetermined region width (e.g., region_w) to provide one or more line buffers where those line buffers have a width corresponding to equation (2) above. For example, referring to pipeline 400 (FIG. 4) and image 600 (FIG. 6), act 304 would involve providing ten (10) line buffers each of which has a width corresponding to 260 pixels.

Process 300 may continue with the receipt of pixel data for processing [act 306]. In some implementations of the invention act 306 may be undertaken by having DPE 102 use memory controller 106 to access pixel data stored in memory 108. Thus, for example, act 306 may involve DPE 102 using an internal Direct Memory Access (DMA) engine (not shown) to access pixel data in memory 108 via controller 106 where, in accordance with some implementations of the invention, the width of the pixel data obtained from memory 108 matches the widths of the line buffers provided in act 304. Continuing the example from above, if DPE is to process pixel 508 (FIG. 5) and the line buffers provided in act 304 have a width of 260 pixels then act 306 may involve DPE 102 obtaining the pixel data corresponding to the nine rows of region 606 (width=240 pixels) centered about the row containing pixel 508 and the pixel data for the overlap regions 608 and 610 taken from, respectively the pixel data corresponding to regions 602 and 612 for those nine rows.

Process 300 may then continue with the processing of the pixel data through the image processing pipeline [act 308]. In accordance with some implementations of the invention, DPE 102 may place the pixel data received in act 306 in the line buffers provided in act 304 and may then undertake act 308 by applying a filter pipeline to that pixel data. Continuing the example from above, DPE 102 may process the pixel data received in act 306 using, in succession, algorithms 402, 404 and 406 (i.e., pipeline 400) to filter the pixel data.

The acts shown in FIG. 3 need not be implemented in the order shown; nor do all of the acts necessarily need to be performed. Also, those acts that are not dependent on other acts may be performed in parallel with the other acts. Further, both acts 302 and 304 may be undertaken once such as, for example, during a preprocessing stage, and then multiple simultaneous occurrences of acts 306 and 308 may be undertaken by two or more processing cores and/or two or more DPEs 102 where, for example, one occurrence of acts 306/308 could be associated with processing pixels in one region (e.g., region 602) while another occurrence of acts 306/308 could be associated with processing pixels in another region (e.g., region 606), etc. Further, at least some of the acts in this figure may be implemented as instructions, or groups of instructions, implemented in a machine-readable medium.

Figure 7:
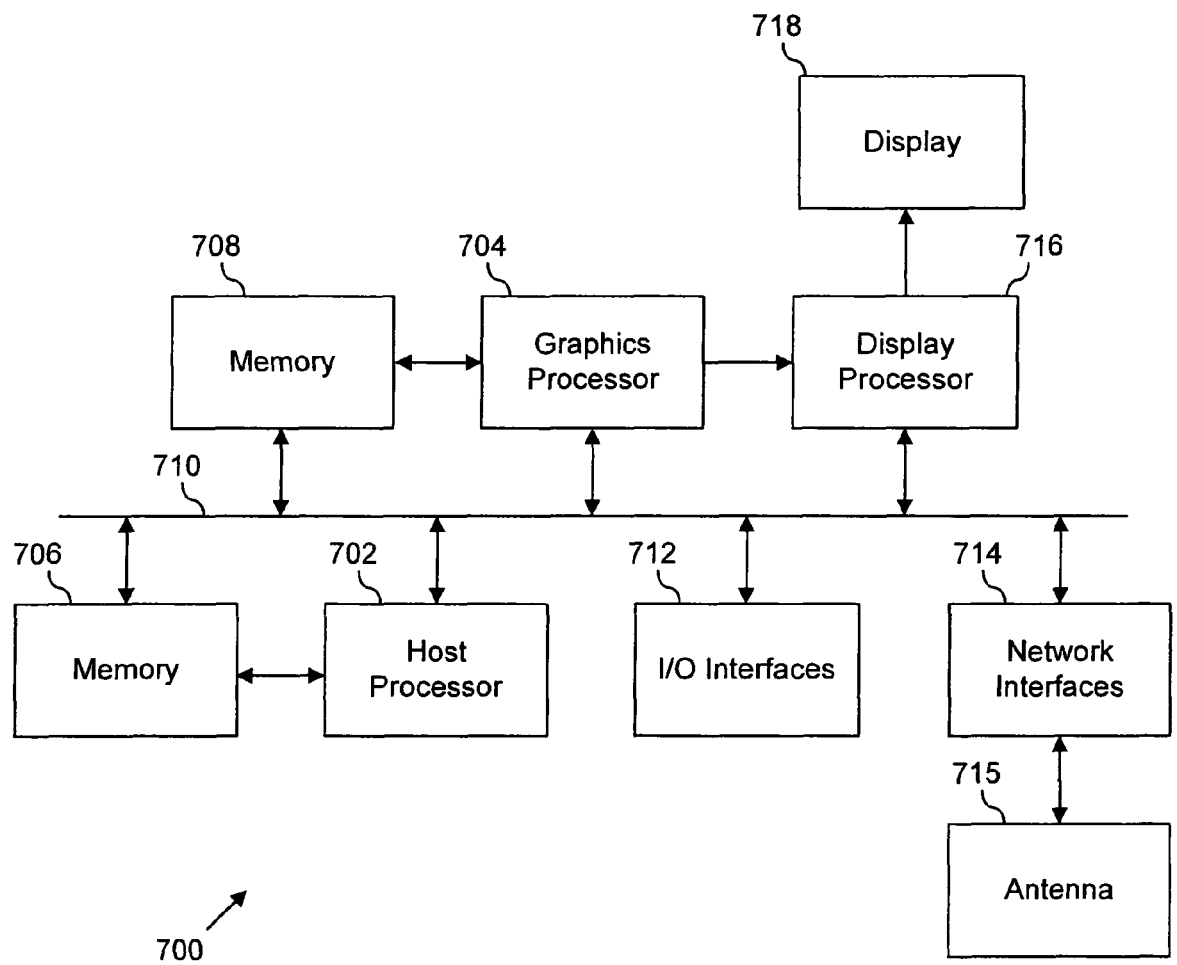
FIG. 7 illustrates a system in accordance with some implementations of the invention.

FIG. 7 illustrates an example system 700 in accordance with some implementations of the invention. System 700 may include a host processor 702, a graphics processor 704, memories 706 and 708 (e.g., dynamic random access memory (DRAM), static random access memory (SRAM), non-volatile memory, etc.), a bus or communications pathway(s) 710, input/output (I/O) interfaces 712 (e.g., universal synchronous bus (USB) interfaces, parallel ports, serial ports, telephone ports, and/or other I/O interfaces), network interfaces 714 (e.g., wired and/or wireless local area network (LAN) and/or wide area network (WAN) and/or personal area network (PAN), and/or other wired and/or wireless network interfaces), a display processor and/or controller 716, and a display 718. System 700 may also include an antenna 715 (e.g., dipole antenna, narrowband Meander Line Antenna (MLA), wideband MLA, inverted "F" antenna, planar inverted "F" antenna, Goubau antenna, Patch antenna, etc.) coupled to network interfaces 714. In general, system 700 may be any system suitable for processing pixel data for display.

System 700 may assume a variety of physical implementations. For example, system 700 may be implemented in a personal computer (PC), a networked PC, a media PC, a server computing system, a handheld computing platform (e.g., a personal digital assistant (PDA)), a gaming system (portable or otherwise), a set-top box (STB), a cellular telephone handset, etc. Moreover, while some components of system 700 may be implemented within a single device, such as a system-on-a-chip (SOC) integrated circuit (IC), components of system 700 may also be distributed across multiple ICs or devices. For example, host processor 702 along with components 704, 706, 712, and 714 may be implemented as multiple ICs contained within, for example, a single PC while display processor 716 may be implemented in a separate device such as display 718 coupled to host processor 702 and components 704, 706, 712, and 714 through communications pathway 710. Alternatively, all items in system 700 other than display 718 may be implemented in a single platform or device, such as, to name a few examples, a media PC or a STB, coupled to display 718.

Host processor 702 may comprise a special purpose or a general purpose processor including any control and/or processing logic (i.e., in the form of hardware, software and/or firmware) capable of providing display processor 716 with pixel data and/or instructions. For example, host processor 702 may place an image frame (or a portion thereof such as several rows of an image region) of pixel data in memory 708 from which display processor 716 may access that pixel data. In one implementation, host processor 702 may be capable of performing any of a number of tasks that support display processing line buffers incorporating pipeline overlap. These tasks may include, for example, although the invention is not limited in this regard, providing pixel processing algorithms, such as algorithms comprising a filter pipeline (e.g., pipeline 400), to display processor 716, downloading microcode (via antenna 715 and interfaces 714) to processor 716, initializing and/or configuring registers within processor 716, interrupt servicing, providing a bus interface for uploading and/or downloading pixel and/or image data, etc. In alternative implementations, some or all of these functions may be performed by display processor 716. Further, while FIG. 7 shows host processor 702 and display processor 716 as distinct components, the invention is not limited in any way in this regard and those of skill in the art will recognize that processors 702 and 716 possibly in addition to other components of system 700 may be implemented within a single IC.

Bus or communications pathway(s) 710 may comprise any mechanism for conveying information (e.g., pixel data, instructions, etc.) between or amongst any of the elements of system 700. For example, although the invention is not limited in this regard, communications pathway(s) 710 may comprise a multipurpose bus capable of conveying, for example, pixel data between memory 706 or memory 108 and display processor 716. Alternatively, pathway(s) 710 may comprise a wireless communications pathway. In addition, graphics processor 704 may include a memory controller (not shown) that provides functionality enabling display processor 716 to provide pixel data to or to obtain pixel data from memories 706/708.

Display processor 716 may comprise any control and/or processing logic (i.e., in the form of hardware, software, and/or firmware) capable of implementing display processing line buffers incorporating pipeline overlap in accordance with some implementations of the invention, and of supplying processed pixel data to display 718. Further, processor 716 may include one or more instances of DPE 102 or may provide the functionality of DPE 102 as described above. In addition, processor 716 may further process processed pixel data, such as that generated by DPE 102 implementing process 300, to, for example, convert color pixel values to corresponding display drive data levels etc. Although FIG. 7 shows display processor 716 as a distinct component, the invention is not limited in this regard, and those of skill in the art will recognize that, for example, some if not all of the functionality of display processor 716 may be performed by graphics processor 704 and/or host processor 702.

Finally, display 718 may be any device capable of displaying pixel data provided by display processor 716 and processed by DPE 102. Thus, to name a few more prominent examples, display 718 may be a liquid crystal display (LCD) or a Plasma Display Panel (PDP). The invention is not, however, limited to any particular type of display panel employed in display 718.

Thus, in accordance with some implementations of the invention, a display processor and/or a display processing engine utilizing line buffers sized to include pipeline overlaps may permit complex, high quality pixel processing algorithms (e.g., motion compensated deinterlacing, mosquito noise reduction, etc.) to be employed in a processing scheme operating on an image divided into horizontally adjacent regions where that scheme retains the mathematical accuracy of those algorithms while at the same time minimizing costs in terms of the silicon area devoted to the display processing pipeline.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 1 and the accompanying text may show and describe a single display processing engine 102 coupled to memory controller 106, those skilled in the art will recognize that display processing systems in accordance with the invention may employ multiple display processing engines, each operating in accordance with the invention, coupled to one or more memory controllers. Clearly, many other implementations may be employed to provide display processing line buffers incorporating pipeline overlap.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Further, those skilled in the art will realize that the terms pixel, pixel value, pixel data, display data and/or image data may be used interchangeably. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   determining a pipeline overlap factor associated with an image processing pipeline to be applied to an image, the image divided into horizontally adjacent image regions, each of the image regions having an region width;
   providing a plurality of line buffers having a width sufficient to accommodate the region width and twice the pipeline overlap factor; and
   processing pixel data through the image processing pipeline using the line buffers.

2. The method of claim 1, wherein the image processing pipeline comprises a plurality of algorithms, each algorithm having an associated horizontal overlap, and wherein determining a pipeline overlap factor comprises determining an additive sum of the horizontal overlaps.

3. The method of claim 2, wherein each algorithm's horizontal overlap comprises the number of horizontally adjacent pixel values of an adjacent image region that the associated algorithm samples when that algorithm operates on a pixel located adjacent a boundary of one image region.

4. The method of claim 1, wherein the region width comprises the number of pixels in one dimension of an image region.

5. The method of claim 4, wherein processing pixel data through the image processing pipeline using the line buffers comprises using the image processing pipeline to convolve pixel values stored in the line buffers with pixel values of an image region wherein the line buffers store pixels of that image region in addition to pixels of an adjacent image region.

6. An article comprising a machine-readable non-transitory medium having stored thereon instructions that, when executed by a machine, cause the machine to:
   determine a pipeline overlap factor associated with an image processing pipeline, the image processing pipeline to process an image frame, the image data frame divided into horizontally adjacent image regions, each image region having a region width;
   provide a plurality of line buffers having a width sufficient to accommodate the region width and twice the pipeline overlap factor; and
   process pixel data through the image processing pipeline using the line buffers.

7. The article of claim 6, wherein the image processing pipeline comprises a plurality of algorithms, each algorithm having an associated horizontal overlap, and wherein the instructions to determine a pipeline overlap factor, when executed by a machine, cause the machine to:
   determine an additive sum of the horizontal overlaps.

8. The article of claim 7, wherein each algorithm's horizontal overlap comprises the number of horizontally adjacent pixel values of an adjacent image region that the associated algorithm samples when that algorithm operates on a pixel located adjacent a boundary of one image region.

9. The article of claim 6, wherein the region width comprises the number of pixels in one dimension of an image region.

10. The article of claim 9, wherein the instructions to process pixel data through the image processing pipeline using the line buffers, when executed by a machine, cause the machine to:
    use the pixel processing pipeline to convolve pixel values stored in the line buffers with pixel values of an image region wherein the line buffers store pixels of that image region in addition to pixels of an adjacent image region.

* * * * *